US012547957B2

(12) United States Patent
Harris et al.

(10) Patent No.: US 12,547,957 B2
(45) Date of Patent: Feb. 10, 2026

(54) SYSTEMS AND METHODS FOR A HOME SAVINGS PLATFORM

(71) Applicant: Wells Fargo Bank, N.A., San Francisco, CA (US)

(72) Inventors: Moses Harris, San Francisco, CA (US); Ramsay Huntley, San Francisco, CA (US); Aishah Miller, San Francisco, CA (US); Placide Muhizi, San Francisco, CA (US); Poonam Rao, San Francisco, CA (US); Timothy Craig Seagren, San Francisco, CA (US); Jud Murchie, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 38 days.

(21) Appl. No.: 18/235,754

(22) Filed: Aug. 18, 2023

(65) Prior Publication Data
US 2025/0061395 A1 Feb. 20, 2025

(51) Int. Cl.
*G06Q 10/0631* (2023.01)
*G06N 20/00* (2019.01)

(52) U.S. Cl.
CPC ....... *G06Q 10/06315* (2013.01); *G06N 20/00* (2019.01)

(58) Field of Classification Search
CPC ......... G06Q 10/06315; G06Q 30/0631; G06Q 30/0645; G06Q 50/16; G06N 20/00
See application file for complete search history.

(56) References Cited

U.S. PATENT DOCUMENTS

| | | | |
|---|---|---|---|
| 11,610,207 B1* | 3/2023 | Chowdhury | G06Q 20/4016 |
| 2015/0235333 A1 | 8/2015 | Bangerter | |
| 2015/0242919 A1* | 8/2015 | Wickam | G06Q 30/0619 705/26.44 |
| 2016/0027102 A1* | 1/2016 | Smith | G06Q 40/00 705/35 |
| 2016/0063550 A1* | 3/2016 | Caldwell | G06Q 30/0269 705/14.53 |
| 2018/0322597 A1 | 11/2018 | Sher | |
| 2020/0126152 A1 | 4/2020 | Voltz, Jr. et al. | |

(Continued)

OTHER PUBLICATIONS

"Increasing Access to Housing for Low-Income Families," NGA Center for Best Practices, Mar. 29, 2002, 10 pages.

*Primary Examiner* — Dylan C White
(74) *Attorney, Agent, or Firm* — Foley & Lardner LLP

(57) ABSTRACT

A provider computing system includes one or more processing circuits including one or more processors coupled to one or more memory devices having instructions stored thereon that, when executed by the one or more processors, cause the one or more processors to determine a user track for a user based on one or more of a user track selection received from a user device associated with the user or user information of the user. The instructions further cause the one or more processors to identify one or more features to provide to the user based on the user track. The instructions further cause the one or more processors to generate a user interface corresponding to the user track, the user interface including the one or more features. The instructions further cause the one or more processors to cause the user interface to be displayed to the user.

20 Claims, 6 Drawing Sheets

(56) References Cited

U.S. PATENT DOCUMENTS

| | | |
|---|---|---|
| 2021/0232374 A1* | 7/2021 | Weibel .................... G06F 11/34 |
| 2022/0005134 A1* | 1/2022 | Hailey ................... G06Q 40/03 |
| 2022/0028004 A1* | 1/2022 | Berd ...................... G06Q 40/06 |
| 2022/0391974 A1 | 12/2022 | Abbey |
| 2023/0052691 A1* | 2/2023 | Thiruvenkatanathan .................... G06N 20/20 |

* cited by examiner

SYSTEMS AND METHODS FOR A HOME SAVINGS PLATFORM

TECHNICAL FIELD

Aspects and embodiments of the present disclosure relate to systems and methods for providing a home savings platform.

BACKGROUND

Customers have a variety of differing housing-related goals. For example, some customers may wish to be long-term renters because they wish to rent in a certain part of a city or in a certain building that is rent-only, or they may wish to have the flexibility to move more easily than someone who owns a home. Some customers qualifying for rental assistance may financially benefit from remaining as renters and receiving rental assistance from the government. These customers may therefore not wish to own their own home, as doing so would cause them to lose their rental assistance payments. Other customers may desire to purchase a home or may currently own a home, but wish to save for one or more home-related expenses (e.g., saving for appliances, maintenance, and/or renovation projects). Each of these customer types may find differing information useful and/or relevant.

SUMMARY

One embodiment relates to a provider computing system associated with a provider. The provider computing system comprises one or more processing circuits including one or more processors coupled to one or more memory devices, the one or more memory devices having instructions stored thereon that, when executed by the one or more processors, cause the one or more processors to determine a user track for a user based on one or more of a user track selection received from a user device associated with the user or user information of the user. The instructions further cause the one or more processors to identify one or more features to provide to the user based on the user track. The instructions further cause the one or more processors to generate a user interface corresponding to the user track, the user interface including the one or more features. The instructions further cause the one or more processors to cause the user interface to be displayed to the user.

Another embodiment relates to a computer-implemented method. The computer-implemented method includes determining, by one or more processors of a computing system, a user track for a user based on one or more of a user track selection received from a user device associated with the user or user information of the user. The computer-implemented method further includes identifying, by the one or more processors, one or more features to provide to the user based on the user track. The computer-implemented method further includes generating, by the one or more processors, a user interface corresponding to the user track, the user interface including the one or more features. The computer-implemented method further includes causing, by the one or more processors, the user interface to be displayed to the user.

Still another embodiment relates to a non-transitory computer-readable medium having instructions stored thereon that, when executed by at least one processing circuit of a provider computing system associated with a provider, cause operations including determining a user track for a user based on one or more of a user track selection received from a user device associated with the user or user information of the user. The operations further include identifying one or more features to provide to the user based on the user track. The operations further include generating a user interface corresponding to the user track, the user interface including the one or more features. The operations further include causing the user interface to be displayed to the user.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Referring generally to the figures, systems and methods for providing users pursuing different living situations/savings goals with relevant information and resources via a home savings platform are disclosed according to various embodiments herein. In some instances, the systems and methods described herein allow for users to select between a long-term renter track, an aspiring homeowner track, and a current homeowner track of the home savings platform. The users are then provided with corresponding home savings pages that include specific information and resources that are relevant to the user's selected track.

In some embodiments, the systems and methods described herein allow for customers to open tax-advantaged savings accounts and track their progress toward their saving goals in real-time. In some embodiments, the systems and methods described herein provide the users with specific insights related to their particular track (e.g., determined using trained machine learning models) along with corresponding links to immediately act on those insights. The users are also able to easily switch between selected tracks if and when their aspirations change over time.

Accordingly, the systems and methods described herein provide a variety of technical improvements to home savings tracking systems and interface technology. For example, traditional home savings tracking systems have not been configured to provide a home savings platform that provides different sets of features to users that are using the home savings platform for different purposes (e.g., to pursue different long-term living goals). Similarly, traditional savings tracking systems have not been configured to produce individually tailored screen layouts that include relevant features, information, and other options for the saver based on the particular track they select. However, the systems and methods described herein solve these issues by identifying specific features and insights to include within graphical user interfaces provided to users that correspond to the particular tracks that the users select and the home savings goals associated with those tracks.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
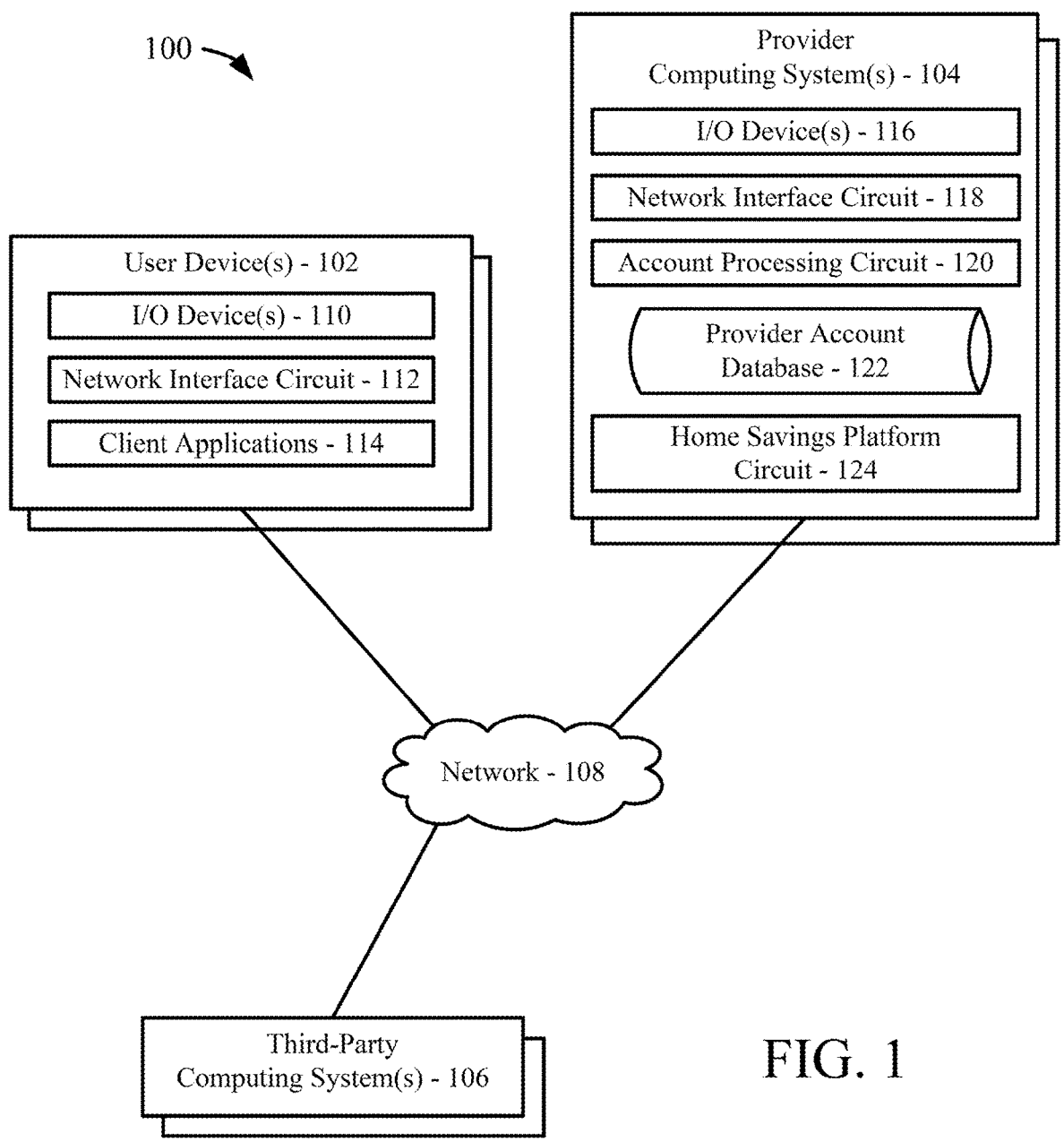
FIG. 1 is a block diagram of a computing environment that provides users pursuing different living situations with relevant information and resources, according to an example embodiment.

FIG. 1 is a diagram of a computing environment 100 that provides users pursuing different living situations with relevant information and resources, according to an example embodiment. As shown, the computing environment 100 includes one or more user (e.g., customer) devices 102, a provider computing system 104, and one or more third-party computing systems 106. The one or more user devices 102, the provider computing system 104, and the one or more third-party computing systems 106 are in communication with each other and are connected by a network 108.

Although various systems and/or devices are shown in FIG. 1 as being (e.g., user devices 102, provider computing systems 104), it will be understood that, in some instances, the computing environment 100 may include one or multiple of any of the various illustrated systems and/or devices, as desired for a given application. Further, while the following descriptions of the various systems and devices are largely provided in terms of single systems or devices, it will be appreciated that these descriptions are similarly applicable to any additional corresponding systems and/or devices (e.g., additional user devices 102, additional provider computing systems 104, and so on).

The user device 102 is owned, operated, controlled, managed, and/or otherwise associated with a user (e.g., a customer of a provider institution associated with the provider computing system 104). In some embodiments, the user device 102 may be or may comprise, for example, a desktop or laptop computer (e.g. a tablet computer), a smartphone, a wearable device (e.g., a smartwatch), a personal digital assistant, and/or any other suitable computing device.

In some embodiments, the user device 102 includes one or more I/O devices 110, a network interface circuit 112, and one or more client applications 114. While the term "I/O" is used, it should be understood that the I/O devices 110 may be input-only devices, output-only devices, and/or a combination of input and output devices. In some instances, the I/O devices 110 include various devices that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the user to provide inputs (such as a touchscreen display, stylus, keyboard, force sensor for sensing pressure on a display screen, etc.). In some instances, the I/O devices 110 further comprise one or more user interfaces (devices or components that interface with the user), which may include one or more biometric sensors (such as a fingerprint reader, a heart monitor that detects cardiovascular signals, face scanner, an iris scanner, etc.).

The network interface circuit 112 includes, for example, program logic and various devices (e.g., transceivers, etc.) that connect the user device 102 to the network 108. The network interface circuit 112 facilitates secure communications between the user device 102 and each of the provider computing system 104 and the one or more third-party computing systems 106. The network interface circuit 112 also facilitates communication with other entities, such as other banks, settlement systems, and so on.

The user device 102 stores in computer memory, and executes ("runs") using one or more processors, various user client applications 114, such as an Internet browser presenting websites, text messaging applications, and/or applications provided or authorized by entities implementing or administering any of the computing systems in computing environment 100.

For example, in some instances, the user client applications 114 comprise a user provider client application (e.g., a financial institution banking application) provided by and at least partly supported by the provider computing system 104. For example, in some instances, the user client application 114 coupled to the provider computing system 104 may enable the user to perform various activities (e.g., account management, account opening and/or closing actions, account withdrawals and deposits) and/or perform various transactions (e.g., the user making a mortgage payment, the user depositing money into a home savings account, etc.) associated with one or more financial accounts of the user held at a provider institution associated with the provider computing system 104. In some instances, the user provider client application (e.g., the user client application 114) may further allow the user to perform various functionalities described herein, such as allowing the user to opt-in to a track-specific home savings platform account.

In some other instances, the user client application 114 provided by the provider computing system 104 may additionally be coupled to one or more third-party computing systems 106 (e.g., via one or more application programming interfaces (APIs) and/or software development kits (SDKs)) to integrate one or more features or services provided by the third-party computing system(s) 106 (e.g., to request real-time credit information from a credit bureau computing system, to request housing and rental market information from third parties, to request maintenance recommendations from third parties).

The provider computing system 104 is owned by, associated with, or otherwise operated by a provider institution (e.g., a bank or other financial institution) that maintains one or more accounts held by various customers (e.g., the user associated with the user device 102), such as demand deposit accounts, credit card accounts, receivables accounts, and so on. The provider computing system 104 may, for example, comprise one or more servers, each with one or more processing circuits having one or more processors configured to execute instructions stored in one or more memory devices to send and receive data stored in the one or more memory devices and perform other operations to implement the methods described herein associated with logic or processes shown in the figures. In some instances, the provider computing system 104 may comprise and/or have various other devices communicably coupled thereto, such as, for example, desktop or laptop computers (e.g., tablet computers), smartphones, wearable devices (e.g., smartwatches), and/or other suitable devices.

In some embodiments, the provider computing system 104 includes one or more I/O devices 116, a network interface circuit 118, an account processing circuit 120, a provider account database 122, and a home savings platform circuit 124. The one or more I/O devices 116 are configured to receive inputs from and display information to a user. While the term "I/O" is used, it should be understood that the I/O devices 116 may be input-only devices, output-only devices, and/or a combination of input and output devices.

In some instances, the network interface circuit 118 includes, for example, program logic that connects the provider computing system 104 to the network 108. The network interface circuit 118 facilitates secure communications between the provider computing system 104 and each of the user device(s) 102 and the third-party computing system(s) 106. The network interface circuit 118 also facilitates communication with other entities, such as other banks, settlement systems, and so on. The network interface circuit 118 further includes user interface program logic configured to generate and present web pages to users accessing the provider computing system 104 over the network 108.

The account processing circuit 120 is structured or configured to perform a variety of functionalities or operations to enable and monitor various user activities (e.g., account processing, product registration processing, account monitoring, etc.) in connection with account information stored within a provider account database 122. In some instances, the account processing circuit 120 performs various functionalities to enable account opening and/or closing actions, product registration actions (e.g., registering for a home savings platform application), account withdrawals and deposits (e.g., account credits and debits to checking and savings accounts), various user account tracking activities, and/or a variety of other services associated with and/or provided by the provider.

The provider account database 122 is structured or configured to retrievably store account information associated with various accounts held or otherwise maintained by the provider institution on behalf of its customers. In some instances, the account information includes both user information and account information pertaining to a given user account. For example, in some instances, the user information may include a name, a phone number, an e-mail address, a physical address, a transaction history, an income level, a disposable income level, an occupation, an age, a net worth, an education level, a marital status, a number of dependents, a credit score, etc. of the user associated with the user account. In some instances, the account information may include balance information, transaction information, information pertaining to the type and corresponding capabilities of the given account, etc.

The home savings platform circuit 124 is structured to enable various functionalities described herein. For example, in some instances, the home savings platform circuit 124 is structured to generate a home savings platform and various associated user interfaces (e.g., user interfaces 200, 300, 400, 500 shown in FIGS. 2-5) configured to provide users with track-specific savings information and resources, as will be described in detail below.

Referring now to FIGS. 2-5 generally, various graphical user interfaces are shown, according to example embodiments. It will be appreciated that the various graphical user interfaces are provided as examples and are in no way meant to be limiting. In some instances, the various graphical user interfaces provided to the user device 102 may include additional information, interactive features, and/or other elements generally, in the same or different arrangements, without departing from the scope of the present disclosure.

Figure 2:
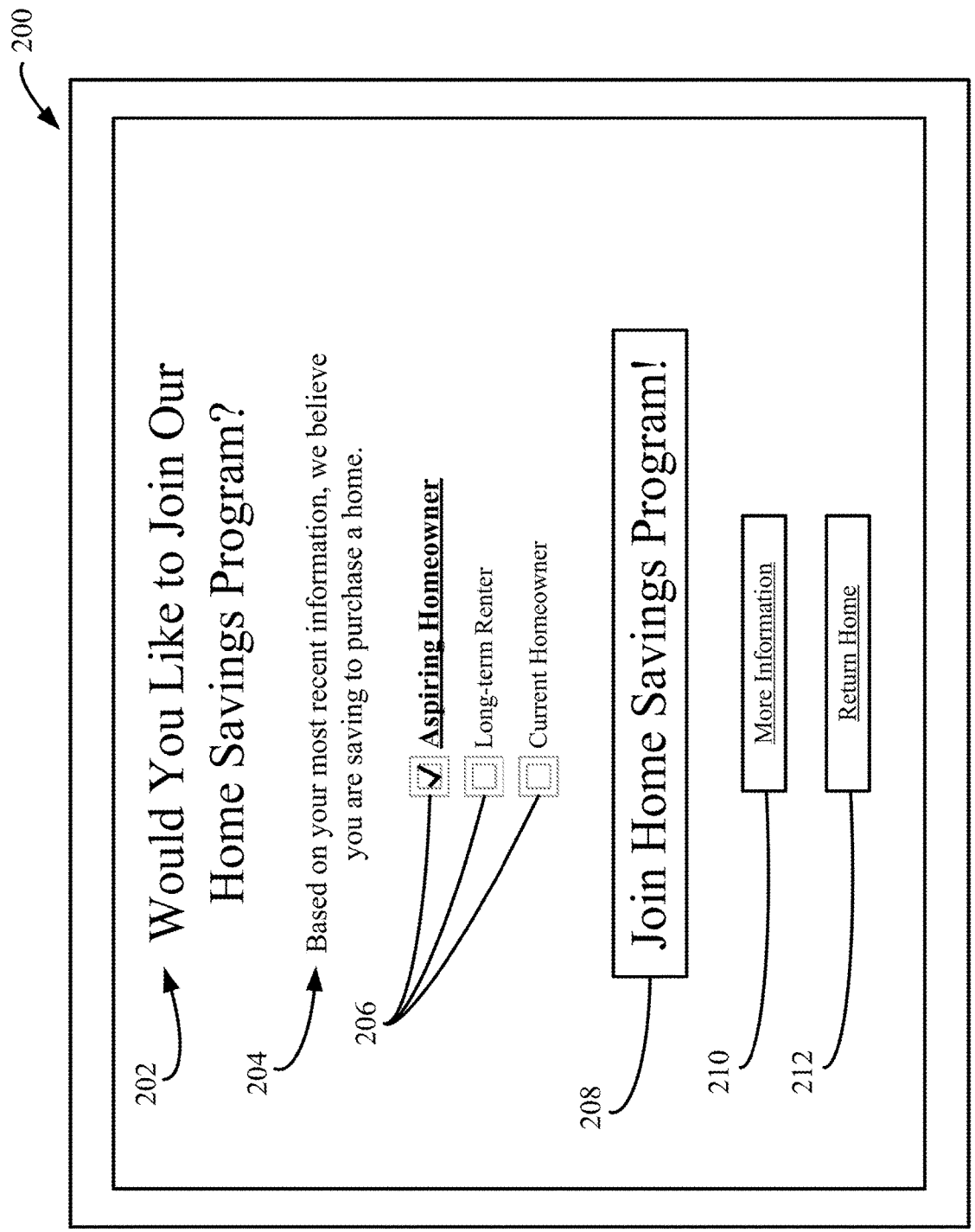
FIG. 2 is a graphical user interface that allows for a user to select a particular home savings track of a home savings platform, according to an example embodiment.

Referring now to FIG. 2, a graphical user interface 200 is shown, according to an example embodiment. As illustrated, the graphical user interface 200 includes a prompt 202, a recommended user track 204, user track selection buttons 206, a join button 208, a more information button 210, and a return button 212. In some instances, the prompt 202 asks the user whether they would like to join the home savings platform, as described herein. The recommended user track 204 is determined by the home savings platform circuit 124, as will be discussed below, and provides the user with a recommended track based on various user information associated with the user.

The user track selection buttons 206 are selectable on the graphical user interface 200 and allow the user to indicate which of the various home savings tracks they would like to enter. For example, in some instances, the user track selection buttons 206 may include buttons for selecting between a first track for users planning to rent a home long-term (e.g., "long-term renter"), a second track for users aspiring to purchase a home (e.g., "aspiring homeowner"), and a third track for users that are homeowners (e.g., "current homeowner"). In some instances, each of the different user tracks has a corresponding sets of features that are relevant to the user's selected tracks, as will be discussed below, with respect to FIGS. 3-5.

In some instances, as described below, the home savings platform circuit 124 is configured to determine a recommended track for the user using one or more machine learning models. Accordingly, in some instances, the user track selection buttons 206 may be arranged such that the recommended track is displayed more prominently than the other user track selection buttons 206. For example, in some instances, the recommend track may be bolded, underlined, enlarged, or moved to uppermost location (i.e., the first choice) of the user track selection button 206. In some instances, upon the one or more machine learning models determine that the recommended track for the user has changed, the home savings platform circuit 124 is configured to modify or update the graphical user interface 200 to rearrange or redesign the user track selection buttons 206 such that the new recommended track is prominently displayed instead of the previous recommended track.

Figure 3:
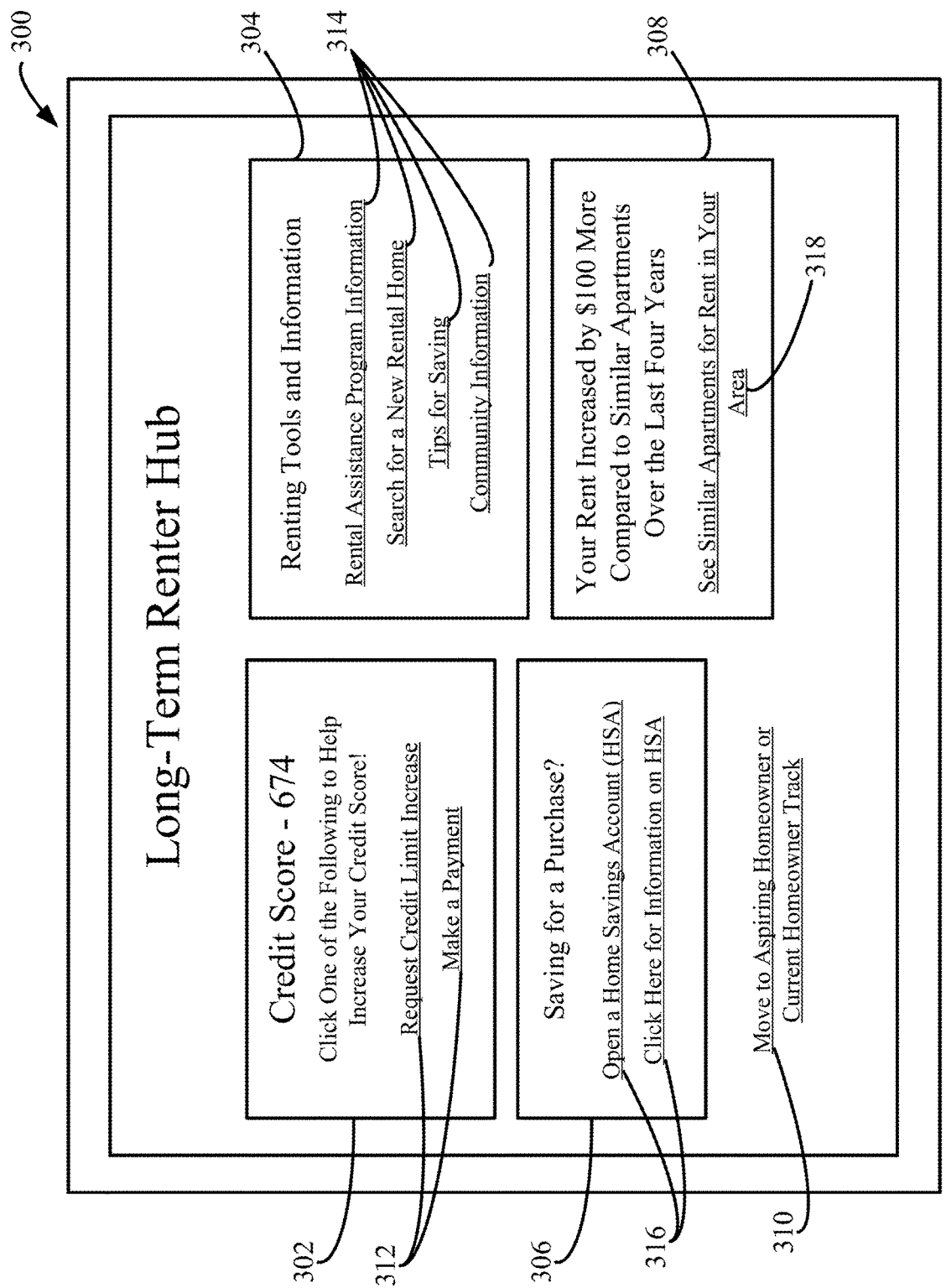
FIG. 3 is another graphical user interface associated with a long-term renter track of the home savings platform, according to an example embodiment.
Figure 4:
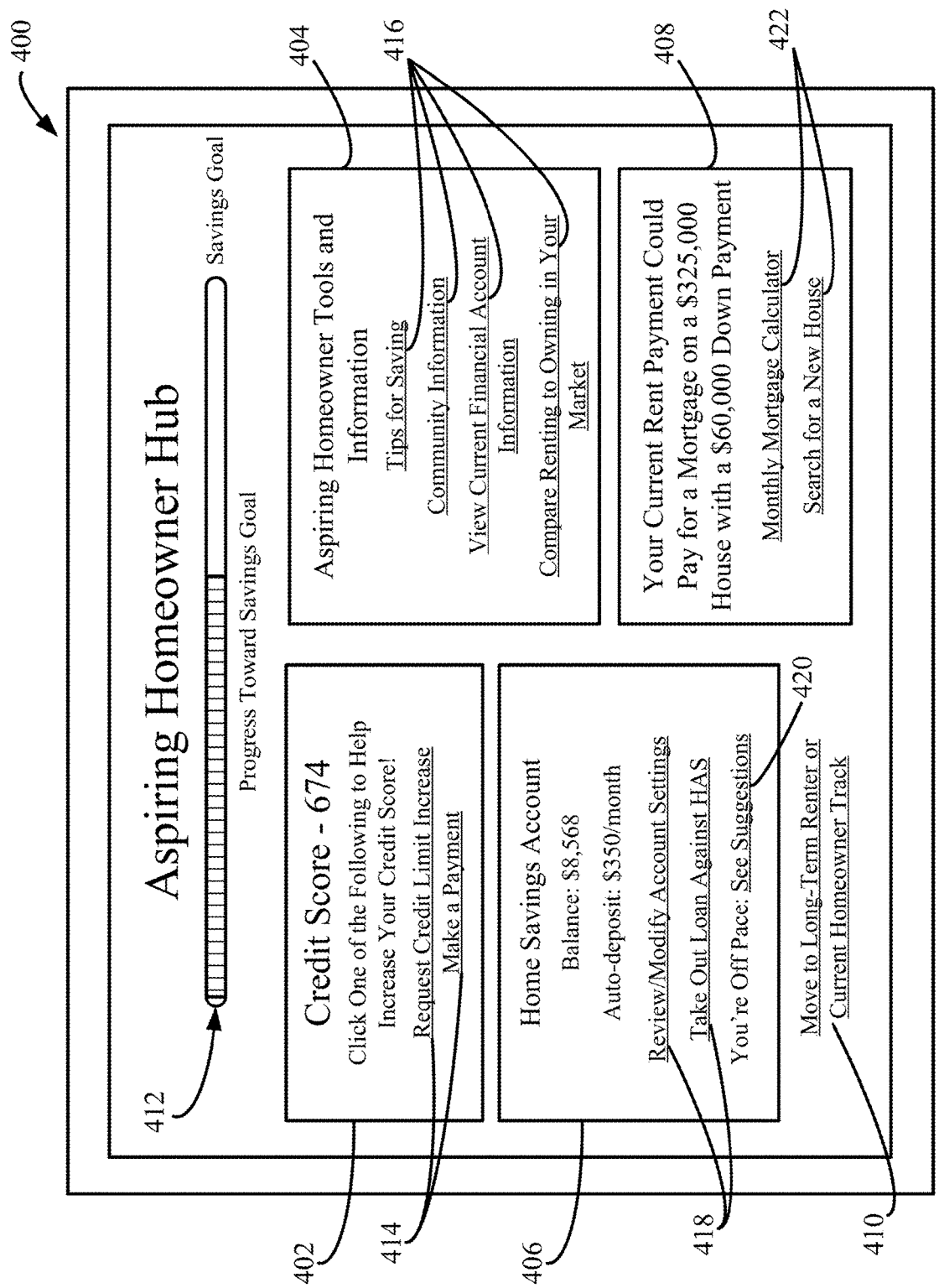
FIG. 4 is another graphical user interface associated with an aspiring homeowner track of the home savings platform, according to an example embodiment.
Figure 5:
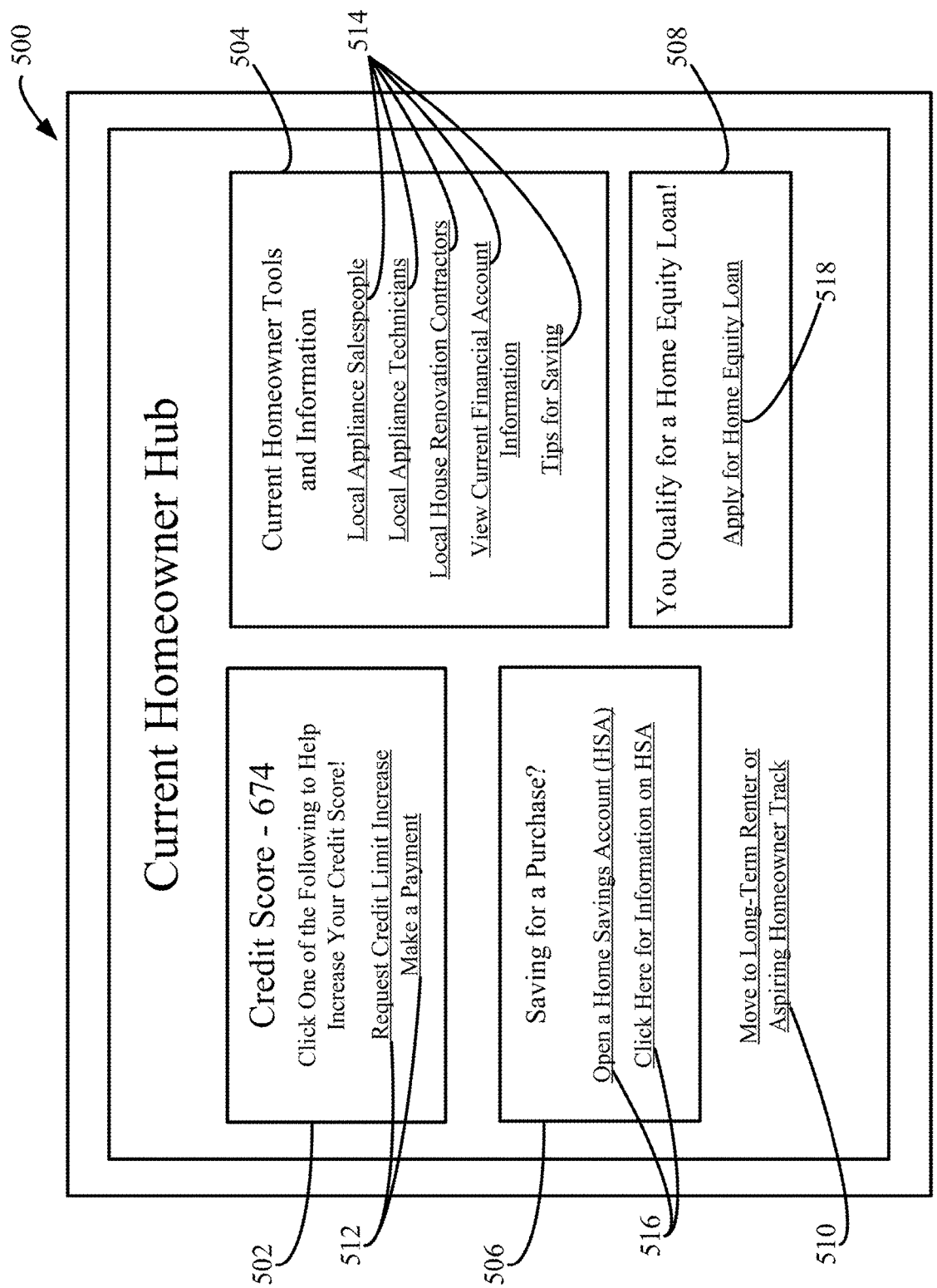
FIG. 5 is another graphical user interface associated with a current homeowner track of the home savings platform, according to an example embodiment.

The user may then interact with or press the join button 208 to be provided with a corresponding home savings track page (e.g., one of graphical user interfaces 300, 400, 500, shown in FIGS. 3-5), the more information button 210 to receive additional information pertaining to the home savings platform, or the return button 212 to return to a banking application provided by the provider institution.

In some instances, the graphical user interface 200 may be displayed to the user as part of the banking application (e.g., one of the client applications 114) provided by the provider computing system 104 to the user device 102. For example, in some instances, the banking application may have a selectable feature on a home page of the banking application that invites the user to join the home savings platform provided by the provider associated with the provider computing system 104. Accordingly, in these instances, the graphical user interface 200 may be displayed to the user upon the user selecting the selectable feature on the home page of the banking application.

In some other instances, the home savings platform circuit 124 of the provider computing system 104 may automatically generate and display the graphical user interface 200 to the user as a pop-up window on the user device 102 (e.g., while the user is using the banking application discussed above) based on various user information pertaining to the user. For example, in some instances, the user may provide various information to the provider during a variety of interactions with the provider (e.g., while opening a new account, while applying for a mortgage, while registering for various products offered by the provider, during a scheduled meeting with an advisor associated with the provider). In some instances, the information may include personal information, such as a name, a phone number, an e-mail address, a physical address, a transaction history, an income level, a disposable income level, an occupation, an age, a net worth, an education level, a marital status, a number of dependents, a credit score, financial goals, etc. of the user associated with the user account. In some instances, the information may further include various documents provided by the user (e.g., tax filing statements, other tax documents, a vision board of the user's goals).

The information gathered during the various interactions may then be stored within a corresponding account associated with the user and held within the provider account database 122. Accordingly, the home savings platform circuit 124 may be configured to determine when the user is likely to find the home savings platform (e.g., a particular savings track) useful based on the information about the user gathered during the various interactions and, in response to this determination, provide the graphical user interface 200 to the user device 102.

In some instances the home savings platform circuit 124 may include one or more machine learning models trained to identify that the user would find the home savings platform useful, as well as which track the user is likely to select. For example, the home savings platform circuit 124 may train the one or more machine learning models to determine a recommended track for each user using training data comprising prior user track selections by other similar users and corresponding prior user information. Accordingly, once the one or more machine learning models have been trained, the home savings platform circuit 124 can retrieve the various user information associated with the user stored within the provider account database 122 and apply it to the one or more machine learning models to identify that the user would likely find the home savings platform useful and determine the recommended track to present to the user (e.g., the recommended user track 204 displayed on the graphical user interface 200). In some instances, the home savings platform circuit 124 may further use the user's ultimate track selection (e.g., the selected user track selection button 206) as feedback to allow for the one or more machine learning models to be continuously updated.

Referring now to FIG. 3, a graphical user interface 300 is shown, according to an example embodiment. In some instances, the graphical user interface 300 is displayed to the customer upon the customer selecting the long-term renter user track selection button 206 and pressing the join button 208 shown in FIG. 2. As illustrated, the graphical user interface 300 includes a credit score widget 302, a renting tools and information widget 304, a tax savings account widget 306, a renter insights widget 308, and a user track switching link 310. As illustrated, the credit score widget 302 may include a real-time credit score of the user. For example, in some instances, the home savings platform circuit 124 is configured to communicate with a third-party computing system 106 that is operated by a credit reporting bureau to obtain the user's real-time credit score (e.g., via an API pull over the network 108).

In some instances, the credit score widget 302 may further include various credit score improvement links 312 and a prompt indicating that the user may increase their credit score by performing various actions associated with the credit score improvement links 312. For example, in some instances, the credit score improvement links 312 may be configured to allow the user to request a credit limit increase on one or more credit cards held by the user. In some instances, the credit score improvement links 312 may be configured to allow the user to make a payment toward paying down the debt owed on one or more credit cards held by the user. In some instances, the credit score improvement links 312 may be configured to allow the user to open a new credit card account and/or close an existing credit card account. In some instances, the credit score widget 302 may include more or less potential credit score improvement options, as desired for a given application. It should be appreciated that the two options shown in FIG. 3 are provided as examples and are in no way meant to be limiting.

The renting tools and information widget 304 includes a variety of renting tool and information links 314 configured to provide the user with access to various tools and information associated with being a long-term renter. In some instances, the various tools and information accessible via the renting tools and information widget 304 may be specific to the user's geographical location. For example, in some instances, the home savings platform circuit 124 may be configured to pull (e.g., via an API associated with the banking application) a real-time location from the user device 102. In other instances, the home savings platform circuit 124 may be configured to utilize an address of the user (e.g., stored and retrieved from the provider account database 122). In yet some other instances, the home savings platform circuit 124 may prompt the user to provide a desired renting or home purchase location (e.g., via an I/O device 110 of the user device 102). In any case, the home savings platform circuit 124 may identify various renting tools and information to display to the user based on the user's location and the user information stored within the provider account database 122.

For example, in some instances, the renting tool and information links 314 include a link configured to provide the user access to rental assistance program information in their area. In some instances, the renting tool and information links 314 include a link configured to allow the user to search for a new rental home. In some instances, the renting tool and information links 314 include a link configured to provide the user with various tips for saving (e.g., for rental-related purchases or in the case that the user has indicated a desire to save for a new home purchase). In some instances, the renting tool and information links 314 include a link configured to provide the user with various information pertaining to the community (e.g., school systems, local parks, public services) in their area. In some instances, the various renting tool and information links 314 may each be configured to navigate the user to an external website associated with the corresponding tool and/or information. In some other instances, the various renting tool and information links 314 may be configured to navigate the user to another page of the banking application populated with the corresponding tool and/or information, which may be pulled from one or more third-party computing systems 106 via one or more API calls.

The tax savings account widget 306 includes a prompt asking whether the user is intending to save for an upcoming home purchase, as well as tax savings account links 316. For example, the tax savings account links 316 may include a first link configured to allow the user to open a tax savings account and a second link configured to provide the user with additional information about the tax savings account. In some instances, the tax savings account may be a tax-advantaged savings account for qualified home purchases (e.g., home furniture, home appliances, home maintenance/repairs, house down payments). In some instances, the tax savings account may be used to save for a qualified gift for a third party (e.g., a relative, a friend). In some instances, the user may select to have a regular contribution made to the tax savings account (e.g., from an account held by the provider). In some instances, the tax savings account may have an annual contribution limit that the user may not surpass. In some instances, the tax savings account may be employer sponsored or state sponsored and the employer or state may elect to provide a predetermined match as a benefit to the user. In some other instances, the tax savings account may have additional limitations (e.g., only qualifies for first home purchases).

The renter insights widget 308 includes a prompt including an example insight for the user pointing out that the user's rent has increased disproportionately to similar local apartments over the last four years and an insight action link 318 configured to allow the user to look for similar apartments for rent in their area. For example, in some instances, the home savings platform circuit 124 may be configured to determine the user's rent payment amount based on account data pulled from the provider account database 122 (e.g., based on recurring payments made by the user over a certain threshold or to a known property management company), as well as how much the user's rent payment has increased over the last several (e.g., three, four, five) years. The home savings platform circuit 124 may then compare the user's rent payment increase to historical rent increases for one or more other similar apartments to the user's apartment (e.g., similar geographical area, similar starting price range, similar number of bedrooms, similar age). In some instances, the home savings platform circuit 124 may pull (e.g., via one or more APIs) the historical rent and characteristic information of other apartment buildings and units from one or more property management or other housing management computing systems (e.g., the third-party computing systems 106). Accordingly, the renter insights widget 308 pulls information from disparate sources to provide insights relevant to long-term renters and provides the insight action link 318 to allow users to take immediate action on those insights.

It should be appreciated that the example insight and insight action link 318 shown in FIG. 3 are provided as examples. In some other instances, various other insights may be determined or identified by the home savings platform circuit 124 and/or other action links may be provided, as desired for a given application.

The user track switching link 310 is configured to allow the user to switch from the long-term renter track (e.g., graphical user interface 300 shown in FIG. 3) to either the aspiring homeowner track (e.g., graphical user interface 400 shown in FIG. 4) or the current homeowner track (e.g., graphical user interface 500 shown in FIG. 5). Accordingly, as the user's goals and/or plans change, the user is allowed to switch between relevant tracks within the home savings platform.

Referring now to FIG. 4, a graphical user interface 400 is shown, according to an example embodiment. In some instances, the graphical user interface 400 is displayed to the customer upon the customer selecting the aspiring homeowner selection button 206 and pressing the join button 208 shown in FIG. 2. As illustrated, the graphical user interface 400 includes a credit score widget 402, an aspiring homeowner tools and information widget 404, a tax savings account widget 406, an aspiring homeowner insights widget 408, a user track switching link 410, and a savings goal progress bar 412. The credit score widget 402 is substantially similar to the credit score widget 302 discussed above and shown in FIG. 3. As illustrated, the credit score widget 402 includes credit score improvement links 414 that are substantially similar to the credit score improvement links 312 discussed above and shown in FIG. 3. Accordingly, the description above, with respect to the credit score widget 302 and credit score improvement links 312 shown in FIG. 3 is similarly applicable to the credit score widget 402 and credit score improvement links 414 shown in FIG. 4.

The aspiring homeowner tools and information widget 404 includes a variety of aspiring homeowner tool and information links 416. The aspiring homeowner tools and information widget 404 and links 416 are similar to the renting tools and information widget 304 and links 314 discussed above with respect to FIG. 3, but are configured to provide the user with access to various tools and information associated with being an aspiring homeowner instead a long-term renter. For example, the various tools and information accessible via the aspiring homeowner tools and information widget 404 may similarly be specific to the user's geographical location. The user's location may be determined in the same ways discussed above, with respect to the renting tools and information widget 304. In any case, the home savings platform circuit 124 may similarly identify various aspiring homeowner tools and information to display to the user based on the user's location and the user information stored within the provider account database 122.

In some instances, various tools and information may be pertinent to both long-term renters and to aspiring homeowners. For example, in some instances, the aspiring homeowner tool and information links 416 may similarly include a link configured to provide the user with various tips for saving (e.g., for a down payment to make a new home purchase) and/or a link configured to provide the user with various information pertaining to the community (e.g., school systems, local parks, public services) in their area.

However, in some instances, the aspiring homeowner tool and information links 416 may include alternative tools and information links that are specifically relevant to aspiring homeowners. For example, in some instances, the aspiring homeowner tool and information links 416 may include a link configured to allow the user view various financial account information associated with financial accounts held by the user. For example, in some instances, the home savings platform circuit 124 is configured to pull user account information associated with the user from the provider account database 122 (e.g., for accounts held by the user with the provider associated with the provider computing system 104). In some instances, the home savings platform circuit 124 may additionally be configured to pull (e.g., via one or more APIs) user account information associated with the user from one or more third-party databases (e.g., provider account databases associated with other provider computing systems of other providers, third-party credit card providers). Accordingly, the user may quickly and conveniently obtain a comprehensive picture of their current financial situation via this link.

Additionally, in some instances, the aspiring homeowner tool and information links 416 may include a link configured to allow the user to compare renting to owning in their specific market. For example, as described above, in some instances, the home savings platform circuit 124 is configured to determine a location or a desired location of the user. This link may allow the user to review pricing for both rental apartments and houses and for-sale apartments and houses and allow the user to compare prices in real-time or near real time.

The tax savings account widget 406 is similar to the tax savings account widget 306, but includes features for a user that has already opened a tax savings account (e.g., via a link similar to the first tax savings account link 316 discussed above, with respect to the tax savings account widget 306). As illustrated, once the user has opened a tax savings account, the tax savings account widget 406 may include, for example, a current balance of the tax savings account, a current auto-deposit amount that is automatically deposited into the tax savings account (as well as the frequency at which the money is automatically deposited), and various tax savings account links 418.

In some instances, the tax savings account links 418 may include a link configured to allow the user to review and/or modify the tax savings account. For example, in some instances, this link may allow users to view a history of their contributions, as well as the interest earned within the tax savings account. This link may also allow users to modify their recurring deposits and/or update a savings goal associated with the tax savings account (e.g., a specified down payment amount). In some instances, the tax savings account links 418 may further include a link to take out a loan against the tax savings account balance. That is, the provider may allow the user to take out a loan using the home savings account balance as collateral for the loan (e.g., similar to a home equity line of credit). In some instances, providing the capability to take a loan out against the home savings account balance may encourage users to make larger deposits into the home savings account by providing flexibility to users who may need to access some of those funds at a later date.

In some instances, the tax savings account widget 406 may further include an indication that the user is off pace for achieving their savings goal within a target amount of time and a suggestion link 420 configured to allow the user to view various suggestions for getting back on track. For example, in some instances, the home savings platform circuit 124 is configured to determine whether the user is on track based on a savings goal provider by the user. For example, the user may provide (e.g., via the user device 102) a savings goal including a savings goal amount and a savings goal timeframe. Accordingly, the home savings platform circuit 124 may determine the user's progress toward their stated goal, as well as whether, at their current payment trajectory, the user will reach their stated goal within the savings goal timeframe. If the home savings platform circuit 124 determines that the user is not on track to meet their savings goal within the savings goal timeframe, the home savings platform circuit 124 may generate various suggestions for the user to get back on track and display the suggestion link 420 that is configured to allow the user to view the various suggestions. In some instances, instead of the suggestion link 420, the various suggestions may be shown directly within the tax savings account widget 406. In either case, the suggestions may be, for example, increasing the monthly auto-deposit, making a one-time deposit to get back on track, and/or adjusting the savings goal timeframe.

In some instances, the home savings platform circuit 124 is configured to generate one or more suggestions for the aspiring homeowner using one or more machine learning models of the home savings platform circuit 124. For example, in some instances, the home savings platform circuit 124 may train the one or more machine learning models to identify actions taken by other users to achieve similar savings goals using various training data. The training data may comprise historical data pertaining to other users' actions taken (e.g., selling personal items, reducing spending in various areas) and corresponding goal achievement information (e.g., savings growth). In some instances, the training data may be data compiled over time from a variety of users associated with the provider and stored within the provider account database 122.

Accordingly, once the one or more machine learning models have been trained, the home savings platform circuit 124 may apply various user information (e.g., personal items owned by the user, spending history of the user) to the one or more machine learning models to identify personalized suggestions for the user to achieve or get back on track with respect to their savings goal. In some instances, the home savings platform circuit 124 is configured to utilize various feedback information (e.g., actions taken by the user, savings growth after taking those actions) received from the user (e.g., via the user device 102) to retrain or otherwise update the one or more machine learning models.

As discussed above, the home savings platform circuit 124 is configured to monitor a progress of the user toward their savings goal. Accordingly, as shown in FIG. 4, the savings goal progress bar 412 may give the user a visual indication of their progress toward the savings goal. It should be appreciated that, although the savings goal progress bar 412 is only depicted within the context of the aspiring homeowner page (e.g., the graphical user interface 400), if a user on the long-term renter or current homeowner track has a savings goal, similar savings goal progress bars may be added to those graphical user interfaces as well.

The aspiring homeowner insights widget 408 is similar to the renter insights widget 308, but includes an insight and corresponding insight action links 422 that pertain to aspiring homeowners instead of long-term renters. For example, the aspiring homeowner insights widget 408 includes an example insight for the user indicating that the user's current rent payment could pay for a mortgage on a $325,000 house with a $60,000 down payment. In some instances, as discussed above, the home savings platform circuit 124 may be configured to determine the user's rent payments. The home savings platform circuit 124 may be configured to pull various mortgage information (e.g., mortgage rates for users having differing credit scores, mortgage payment calculation information) from one or more databases associated with or otherwise in communication with the provider computing system 104 (e.g., if the provider offers home mortgages) and/or from one or more third-party mortgage company computing systems (e.g., one of the third-party computing systems 106). The home savings platform circuit 124 may then utilize the various mortgage information and the users current rent payment to provide an insight into the type of house the user may be able to afford.

In some instances, the insight action links 422 may be configured to allow the user to access a monthly mortgage calculator. In some instances, the insight action links 422 may be further configured to allow the user to begin searching for a new house.

It should be appreciated that the example insight and insight action links 422 shown in FIG. 4 are provided as examples. In some other instances, various other insights may be determined or identified by the home savings platform circuit 124 and/or other action links may be provided, as desired for a given application.

The user track switching link 410 is similarly configured to allow the user to switch from the aspiring homeowner track (e.g., graphical user interface 400 shown in FIG. 4) to either the long-term renter track (e.g., graphical user interface 300 shown in FIG. 3) or the current homeowner track (e.g., graphical user interface 500 shown in FIG. 5).

Referring now to FIG. 5, a graphical user interface 500 is shown, according to an example embodiment. In some instances, the graphical user interface 500 is displayed to the customer upon the customer selecting the current homeowner selection button 206 and pressing the join button 208 shown in FIG. 2. As illustrated, the graphical user interface 500 includes a credit score widget 502, a current homeowner tools and information widget 504, a tax savings account widget 506, a current homeowner insights widget 508, and a user track switching link 510. The credit score widget 502 is substantially similar to the credit score widgets 302, 402 discussed above and shown in FIGS. 3 and 4. As illustrated, the credit score widget 502 also includes credit score improvement links 512 that are substantially similar to the credit score improvement links 312, 414 discussed above and shown in FIGS. 3 and 4. Accordingly, the description above, with respect to the credit score widgets 302, 402 and credit score improvement links 312, 414 shown in FIGS. 3 and 4 is similarly applicable to the credit score widget 502 and credit score improvement links 512 shown in FIG. 5.

The current homeowner tools and information widget 504 includes a variety of current homeowner tool and information links 514. The current homeowner tools and information widget 504 and links 514 are similar to the renting and aspiring homeowner tools and information widgets 304, 404 and links 314, 416 discussed above with respect to FIGS. 3 and 4, but are configured to provide the user with access to various tools and information associated with being a current homeowner instead a long-term renter or aspiring homeowner. For example, the various tools and information accessible via the current homeowner tools and information widget 504 may similarly be specific to the user's geographical location. The user's location may be determined in the same ways discussed above, with respect to the renting tools and information widget 304. In any case, the home savings platform circuit 124 may similarly identify various current homeowner tools and information to display to the user based on the user's location and the user information stored within the provider account database 122.

In some instances, various tools and information may be pertinent to two or more of long-term renters, aspiring homeowners, and current homeowners. For example, in some instances, the aspiring homeowner tool and information links 514 may similarly include a link configured to provide the user with various tips for saving (e.g., for a new home-improvement purchase) and/or a link configured to allow the user to view various financial account information associated with financial accounts held by the user.

However, in some instances, the current homeowner tool and information links 514 may further include links that are specifically relevant to current homeowners. For example, in some instances, the current homeowner tool and information links 514 may include links to local appliance salespeople, to local appliance technicians, and/or to local house renovation contractors. For example, in some instances, the home savings platform circuit 124 is configured to pull information pertaining to local appliance salespeople, appliance technicians, and/or house renovation contractors from one or more third-party computing system 106. The home savings platform circuit 124 may further be configured to determine that the user has one or more given appliances based on information associated with the user and stored within the provider account database 122.

The tax savings account widget 506 is substantially similar to the tax savings account widget 306 discussed above, with respect to FIG. 3. As illustrated, the tax savings account widget 506 also includes tax savings account links 516 that are substantially similar to the tax savings account links 316 discussed above, with respect to FIG. 3. Accordingly, the description above, with respect to the tax savings account widget 306 and tax savings account links 316 shown in FIG. 3 is similarly applicable to the tax savings account widget 506 and tax savings account links 516 shown in FIG. 5. It should further be appreciated that, once the user opens a tax savings account (e.g., via one of the tax savings account links 516), the tax savings account widget 506 may be updated to include features similar to those discussed above, with respect to the tax savings account widget 406 shown in FIG. 4.

The current homeowner insights widget 508 is similar to the renter and aspiring homeowner insights widgets 308, 408, but includes an insight and corresponding insight action links 518 that pertain to current homeowners instead of long-term renters or aspiring homeowners. For example, the current homeowner insights widget 508 includes an example insight for the user indicating that the user qualifies for a home equity loan. For example, in some instances, the home savings platform circuit 124 is configured to determine that the user qualifies for a home equity loan (e.g., for use completing a home maintenance or renovation project) by comparing the user's equity in their home (e.g., determined based on mortgage payment information pulled from the provider account database 122), the user's credit score, and/or any other pertinent information to one or more rules associated with granting a home equity loan set by the provider. In some instances, the home savings platform circuit 124 may further use the user's history of consecutive deposits into the tax savings account as an indication of creditworthiness when determining whether to approve the home equity loan. In some instances, the insight action link 518 is configured to allow the user to apply for the home equity loan from within the current homeowner insights widget 508.

It should be appreciated that the example insight and insight action link 518 shown in FIG. 5 are provided as examples. In some other instances, various other insights may be determined or identified by the home savings platform circuit 124 and/or other action links may be provided, as desired for a given application. Furthermore, a similar process to the process discussed above for determining whether the user qualifies for the home equity loan may be utilized to provide insights related to the user's qualification for other types of loans (e.g., personal loans or mortgages) to be provided to users on any of the long-term renter, aspiring homeowner, and/or current homeowner tracks (e.g., within any of the graphical user interfaces 300, 400, 500).

For example, in some instances, the home savings platform circuit 124 is configured to generate one or more insights and/or recommendations for the homeowner for inclusion within the current homeowner insights widget 508 using one or more machine learning models of the home savings platform circuit 124. For example, in some instances, the home savings platform circuit 124 may train the one or more machine learning models to identify when various warranties and/or appliances may need to be replaced using various training data. The training data may comprise historical data pertaining to other users' warranties and/or appliances, when those warranties and/or appliances were replaced, and/or when those warranties expired and/or those appliances ultimately failed. In some instances, the training data may be data compiled over time from a variety of users associated with the provider and stored within the provider account database 122.

Accordingly, once the one or more machine learning models have been trained, the home savings platform circuit 124 may apply the user's warranty and/or appliance information to the one or more machine learning models to identify when the user should renew their warranty and/or replace their appliance. In some instances, the home savings platform circuit 124 is configured to utilize various feedback information (e.g., warranty renewal information, appliance replacement information, appliance failure information) received from the user (e.g., via the user device 102) to retrain or otherwise update the one or more machine learning models.

It should be appreciated that, in some instances, insights included within the renter insights widget 308 and/or the aspiring homeowner insights widget 408 may similarly be generated using one or more similarly trained machine learning models (e.g., trained to determine that the user's rent has increased disproportionately and/or to identify that the user could purchase a home of a given value based on their current rent payments).

The user track switching link 510 is similarly configured to allow the user to switch from the current homeowner track (e.g., graphical user interface 500 shown in FIG. 5) to either the long-term renter track (e.g., graphical user interface 300 shown in FIG. 3) or the aspiring homeowner track (e.g., graphical user interface 400 shown in FIG. 4).

It should be appreciated that the various tools, links, and insights shown in FIGS. 3-5 within the various graphical user interface 300, 400, 500 are provided as examples. In some instances, additional tools, links, and/or insights may be provided, as desired for a given application. For example, in some instances, various functionality provided by one or more of the third-party computing systems 106 described herein may be directly embedded (e.g., via one or more APIs or SDK packages) within one or more of the widgets included in one or more of the graphical user interfaces. Further, in some instances, the tools, links, and/or insights shown within certain widgets and/or certain graphical user interfaces may be displayed within other widgets and/or graphical user interfaces in the same or different arrangements, as desired for a given application.

Furthermore, in some instances, the widgets and features shown within the graphical user interfaces 300, 400, 500 may be arranged within the corresponding graphical user interfaces based on their estimated relevance to the user. For example, in some instances, the home savings platform circuit 124 is configured to estimate the most relevant and/or useful widgets and features for inclusion with in the corresponding graphical user interfaces 300, 400, 500 using one or more machine learning models of the home savings platform circuit 124. In some instances, the home savings platform circuit 124 may train the one or more machine learning models to identify the most relevant and/or useful widgets and features for inclusion using various training data. The training data may comprise historical utilization of similar features and widgets by users, corresponding track selections by those users, and corresponding user information (e.g., income level, number of dependents, geographical location) associated with those user. In some instances, the training data may be data compiled over time from a variety of users associated with the provider and stored within a database associated with the provider computing system 104 (e.g., the provider account database 122).

Accordingly, once the one or more machine learning models have been trained, the home savings platform circuit 124 may apply the track selection and various user information pertaining to the user to the one or more machine learning models to identify the most relevant and/or useful widgets and features for inclusion on the corresponding graphical user interface (e.g., one of the graphical user interfaces 300, 400, 500). The home savings platform circuit 124 may further arrange the widgets and features specifically according to their estimated relevance. For example, in some instances, the most relevant features may be arranged in a top left corner of the screen. The features may then be arranged in descending order of relevance from left to right and top to bottom within the graphical user interface. In some instances, the home savings platform circuit 124 is configured to utilize various feedback information (e.g., features and widgets actually used by the user) received from the user (e.g., via the user device 102) to retrain or otherwise update the one or more machine learning models. Accordingly, in some instances, the home savings platform circuit 124 may rearranged the widgets and/or features on the graphical user interface based on the updated machine learning models and their associated outputs.

With an example structure of the computing environment 100 and various associated user interfaces (e.g., user interfaces 200, 300, 400, 500) being described above, example processes performable by the computing environment 100 (or components/systems thereof) will be described below. It should be appreciated that the following processes are provided as examples and are in no way meant to be limiting. Additionally, various method steps discussed herein may be performed in a different order or, in some instances, completely omitted. These variations have been contemplated and are within the scope of the present disclosure.

Figure 6:
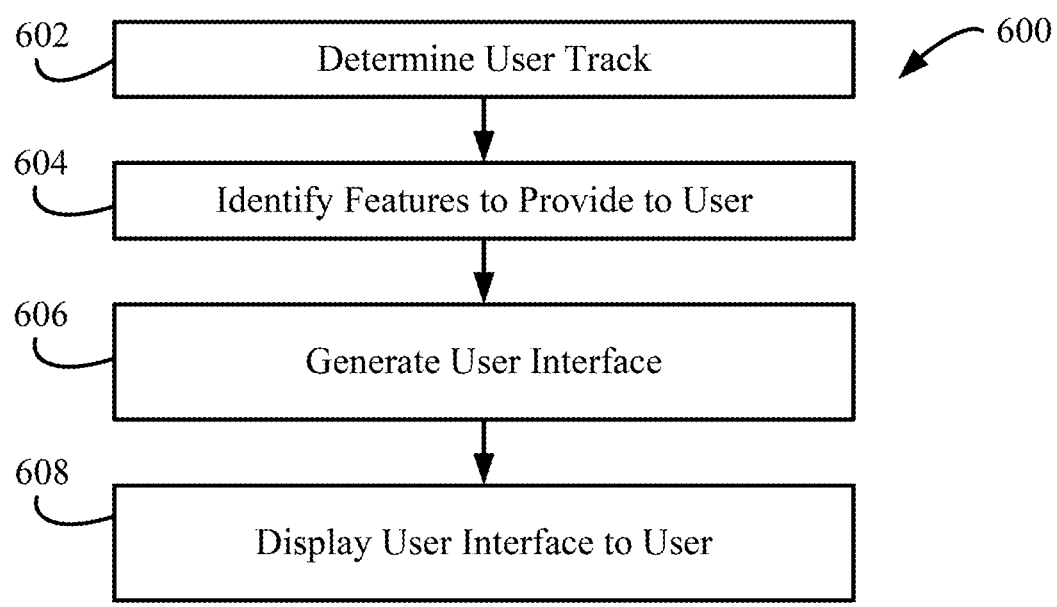
FIG. 6 is flow diagram of a method for providing a home savings track user interface page, according to an example embodiment.

Referring now to FIG. 6, a flow diagram of a method 600 for providing a home savings track user interface page is shown, according to an example embodiment. As shown, the method 600 begins by the provider computing system 104 determining a user track for the user, at step 602. For example, as discussed above, in some instances, the home savings platform circuit 124 may determine, using the one or more trained machine learning models discussed above, an appropriate track for the user based on various gathered information associated with the user (e.g., a name, a phone number, an e-mail address, a physical address, a transaction history, an income level, a disposable income level, an occupation, an age, a net worth, an education level, a marital status, a number of dependents, a credit score, financial goals, a vision board, etc. of the user associated with the user account). In some instances, the home savings platform circuit 124 may alternatively determine the track for the user based on a received track selection.

Once the user track has been determined, at step 602, the provider computing system 104 identifies one or more features associated with the user track, at step 604, and generates the appropriate graphical user interface, at step 606. For example, as discussed above, depending on the determined user track, the home savings platform circuit 124 is configured to provide differing features to users within corresponding graphical user interfaces that are relevant to the users for achieving the type of home savings goals associated with the users' corresponding user tracks. For example, if the determined user track is the long-term renter track, the home savings platform circuit 124 may be configured to identify the features of and generate the graphical user interface 300 discussed above. If the determined user track is the aspiring homeowner track, the home savings platform circuit 124 may be configured to identify the features of and generate the graphical user interface 400 discussed above. If the determined user track is the current homeowner track, the home savings platform circuit 124 may be configured to identify the features of and generate the graphical user interface 500 discussed above. Finally, the user interface is displayed to the user, at step 608.

In some embodiments, in some instances, the provider may offer incentives (e.g., savings rates on various purchases, lower interest rates on loans, and/or various other benefits) for signing up for one of the various tracks described herein. For example, in some instances, the graphical user interface FIG. 2 may further include an offered incentive displayed next to each of the user track selection buttons 206.

In some instances, the provider may offer similar incentives for the user to share additional information with the provider (e.g., via the user device 102 communicating with the provider computing system 104) to improve the training of and/or the accuracy of the resulting suggestions/insights provided by the various machine learning models described herein. The provider may also offer similar incentives for the user achieving a savings goal or meeting a predetermined amount of progress toward their savings goal. As an example, in some instances, the one or more offered incentives may be included on any of the graphical user interfaces 300, 400, 500 (e.g., within one or more of the various widgets).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the embodiments might include a general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A provider computing system associated with a provider, the provider computing system comprising:
   one or more processing circuits including one or more processors coupled to one or more memory devices, the one or more memory devices having instructions stored thereon that, when executed by the one or more processors, cause the one or more processors to:
      train one or more machine learning models to identify features for inclusion in user interfaces corresponding to user tracks based on historical data associated with a plurality of past users;
      receive feedback pertaining to features identified by the one or more machine learning models for inclusion in the user interfaces;
      retrain the one or more machine learning models using the received feedback;
      determine a user track for a user based on one or more of a user track selection received from a user device associated with the user or user information of the user;
      identify, using the one or more machine learning models, one or more features to include in a user interface based on the user track;
      generate the user interface corresponding to the user track, the user interface including the one or more features; and
      cause the user interface to be displayed to the user.

2. The provider computing system of claim 1, wherein the user track is determined from a plurality of user tracks, the plurality of user tracks comprising a first track for users planning to rent a home long-term, a second track for users aspiring to purchase a home, and a third track for users that are homeowners.

3. The provider computing system of claim 2, wherein the one or more features included in the user interface comprise a first set of features when the user track is the first track, a second set of features when the user track is the second track, and a third set of features when the user track is the third track, each of the first set of features, the second set of features, and the third set of features being different.

4. The provider computing system of claim 1, wherein the instructions further cause the one or more processors to:
   collect the user information of the user, the user information including one or more of a purchase history of the user, a goal of the user, or a vision board of the user;
   determine a recommended track for the user based on the user information;
   transmit a track recommendation including the recommended track to the user device; and
   receive the user track selection from the user.

5. The provider computing system of claim 4, wherein determining the recommended track is performed using one or more machine learning models and the instructions further cause the one or more processors to:
   train the one or more machine learning models to determine the recommended track using training data comprising prior user track selections corresponding to prior user information; and
   update the one or more machine learning models based on the user information and the user track selection.

6. The provider computing system of claim 1, wherein the user track corresponds to a user goal and the one or more features include a progress tracking feature that provides a visual indication of an amount of progress achieved by the user toward the user goal.

7. The provider computing system of claim 6, wherein the instructions further cause the one or more processors to:
   train one or more machine learning models to determine one or more goal achievement suggestions using training data comprising prior goal achievements corresponding to prior user information;
   determine the one or more goal achievement suggestions using the one or more machine learning models based on the user information;
   receive feedback from the user pertaining to an effect of the one or more goal achievement suggestions; and update the one or more machine learning models based on the user information and the feedback.

8. The provider computing system of claim 6, wherein the one or more features further include one or more selectable options to perform one or more actions associated with the user goal.

9. The provider computing system of claim 1, wherein the one or more features include a first selectable option to open a tax savings account associated with the user track, and the instructions further cause the one or more processors to:
receive a selection of the first selectable option from the user;
in response to receiving the selection of the first selectable option, open the tax savings account; and
in response to opening the tax savings account, updating the user interface to include a second selectable option to take out a loan against funds within the tax savings account.

10. The provider computing system of claim 1, wherein training the one or more machine learning models to identify the features for inclusion in the user interface comprises training the one or more machine learning models to identify an estimated relevance for the features, and wherein generating the user interface includes arranging the one or more features within the user interface in a descending order of the estimated relevance from left to right.

11. A computer-implemented method comprising:
training, by one or more processors of a computing system, one or more machine learning models to identify features for inclusion in user interfaces corresponding to user tracks based on historical data associated with a plurality of past users;
receiving, by the one or more processors, feedback pertaining to features identified by the one or more machine learning models for inclusion in the user interfaces;
retraining, by the one or more processors, the one or more machine learning models using the received feedback;
determining, by the one or more processors, a user track for a user based on one or more of a user track selection received from a user device associated with the user or user information of the user;
identifying, by the one or more processors using the one or more machine learning models, one or more features to include in a user interface based on the user track;
generating, by the one or more processors, the user interface corresponding to the user track, the user interface including the one or more features; and
causing, by the one or more processors, the user interface to be displayed to the user.

12. The computer-implemented method of claim 11, wherein the user track is one of a long-term renter track, an aspiring homeowner track, or a current homeowner track.

13. The computer-implemented method of claim 12, wherein the one or more features included in the user interface comprise a first set of features associated with long-term renting when the user track is the long-term renter track, a second set of features associated with purchasing a home when the user track is the aspiring homeowner track, and a third set of features associated with owning a home when the user track is the current homeowner track.

14. The computer-implemented method of claim 11, wherein the user track corresponds to a user goal and the one or more features include a progress tracking feature that provides an indication of progress by the user toward the user goal.

15. The computer-implemented method of claim 11, wherein the one or more features include a selectable option to open a tax savings account associated with the user track.

16. A non-transitory computer-readable medium having instructions stored thereon that, when executed by at least one processing circuit of a provider computing system associated with a provider, cause operations comprising:
training one or more machine learning models to identify features for inclusion in user interfaces corresponding to user tracks based on historical data associated with a plurality of past users;
receiving feedback pertaining to features identified by the one or more machine learning models for inclusion in the user interfaces;
retraining the one or more machine learning models using the received feedback;
determining a user track for a user based on one or more of a user track selection received from a user device associated with the user or user information of the user;
identifying, using the one or more machine learning models, one or more features to include in a user interface based on the user track;
generating the user interface corresponding to the user track, the user interface including the one or more features; and
causing the user interface to be displayed to the user.

17. The non-transitory computer-readable medium of claim 16, wherein the user track corresponds to a user goal, is one of a long-term renter track, an aspiring homeowner track, or a current homeowner track, and includes a progress tracking feature that provides an indication of progress by the user toward the user goal.

18. The non-transitory computer-readable medium of claim 17, wherein the operations further comprise:
training one or more machine learning models to determine one or more goal achievement suggestions using training data comprising prior goal achievements corresponding to prior user information;
determining the one or more goal achievement suggestions using the one or more machine learning models based on the user information;
receiving feedback from the user; and
updating the one or more machine learning models based on the user information and the feedback.

19. The non-transitory computer-readable medium of claim 16, wherein the operations further comprise:
collecting the user information of the user, the user information including one or more of a purchase history of the user, a goal of the user, or a vision board of the user;
determining a recommended track for the user based on the user information;
transmitting a track recommendation including the recommended track to the user device; and
receiving the user track selection from the user.

20. The non-transitory computer-readable medium of claim 19, wherein determining the recommended track is performed using one or more machine learning models and the operations further comprise:
training the one or more machine learning models to determine the recommended track using training data comprising prior user track selections corresponding to prior user information; and
updating the one or more machine learning models based on the user information and the user track selection.

* * * * *